Oct. 7, 1947.    C. E. VALENTINE    2,428,595
REGULATING SYSTEM
Filed Jan. 19, 1945
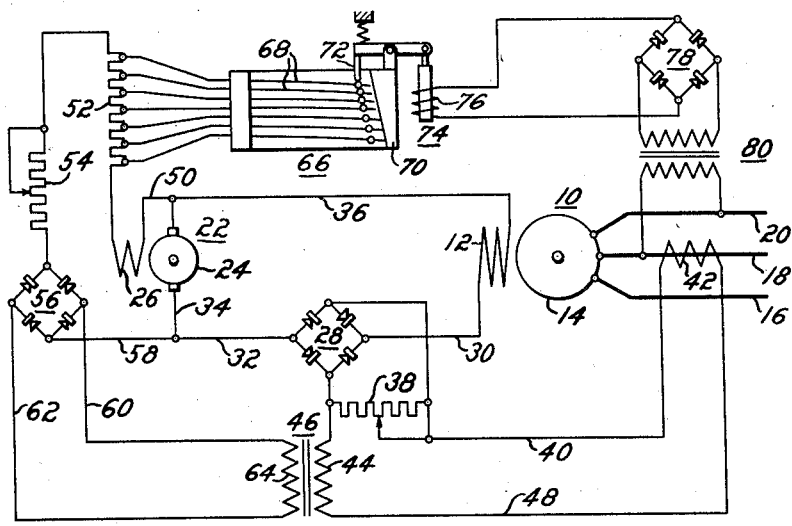
WITNESSES:
INVENTOR
Carroll E. Valentine.
BY
ATTORNEY Patented Oct. 7, 1947

2,428,595

UNITED STATES PATENT OFFICE 2,428,595

REGULATING SYSTEM

Carroll E. Valentine, Forest Hills, Pa., assignor to Westinghouse Electric Corporation, East Pittsburgh, Pa., a corporation of Pennsylvania Application January 19, 1945, Serial No. 573,554

4 Claims. (Cl. 171—119)

1

This invention relates to regulating systems.

In the electrical industry many regulating systems have been developed to govern the excitation of generators to maintain rated voltage. However, where the load supplied by the generator is suddenly increased and the load thus applied is large as compared to the rating of the generator, a voltage drop is encountered and it has been substantially impossible for the known regulating systems to immediately correct for the voltage drop to maintain rated voltage. Thus the problem of automatically minimizing the magnitude and duration of the voltage drop is of considerable importance to the industry.

An object of this invention is to provide in a regulating system for a generator for minimizing the magnitude and duration of a voltage drop across the generator when large loads are suddenly applied thereto.

Another object of this invention is to provide in a regulating system for substantially instantaneously sustaining or increasing the excitation of a generator when a load large compared to the rating of the generator is suddenly applied.

Other objects of this invention will become apparent from the following description when taken in conjunction with the accompanying drawing, the single figure of which is a diagrammatic view of a circuit and apparatus illustrating an embodiment of the invention.

Referring to the drawing, there is illustrated a generator 10 having a field winding 12 and an armature winding 14 connected for supplying alternating current energy to a load circuit represented by conductors 16, 18 and 20. The field winding 12 is disposed to be energized from an exciter 22 comprising an armature winding 24 and a field winding 26. A full wave rectifier 28 is connected in the field winding circuit for the generator 10, one of the output terminals of the rectifier being connected by conductor 30 to an end of the field winding 12, the other output terminal of the rectifier being connected by conductors 32 and 34 to one side of the armature winding 24. The other side of the armature winding 24 is connected by conductor 36 to the other end of the field winding 12.

The alternating current terminals of the rectifier 28 are connected across a variable resistor 38, one terminal of which is connected by conductor 40 to one end of a current transformer 42 which is energized in accordance with the load current in conductor 18. The other terminal of the resistor 38 is connected through the primary winding 44 of a current transformer 46 and con-

2 ductor 48 to the other end of the current transformer 42. Thus the rectifier 28 is energized in proportion to the load current to effect a flow of current through the field winding 12 of the generator that is proportional to the magnitude of the load current, the resistor 38 being adjustable to determine the proportion of the load current thus impressed on the field winding circuit.

The field winding 26 of the exciter 22 is disposed with one of its terminals connected by conductor 50 to a terminal of the armature winding 24, the other terminal of the field winding 26 being connected through a field rheostat 52, and an adjustable resistor 54 to one of the output terminals of a full wave rectifier 56, the other output terminal of which is connected by conductors 58 and 34 to the other terminal of the armature winding 24. The alternating current terminals of the rectifier 56 are connected by conductors 60 and 62 across the secondary winding 64 of the current transformer 46 and the rectifier 56 is thus energized in proportion to the magnitude of the load current to effect a flow of current through the field winding 26 of the exciter 22 that is proportional to the load current.

In order to govern the excitation of the exciter 22 and consequently the generator 10, provision is made to control the connecting of the different sections of the rheostat 52 in circuit with the field winding 26 in response to variations in the voltage across the load conductors. In the embodiment illustrated, a switching mechanism 66 of the type disclosed and claimed in Patent No. 2,246,301, which issued June 17, 1941, to C. R. Hanna et al. is utilized. The switching mechanism 66 briefly comprises a plurality of long thin leaf conducting members 68 which have one end fixed and connected to taps of the rheostat 62, the other end of each leaf member being self biased in a direction to seat on a stop 70 which has a sloped surface. A driver member 72 is spring biased to actuate the leaf members 68 away from the stop 70 into engagement to progressively shunt sections of the rheostat, the driver member 72 being actuated to release the leaf members 68 when the electromagnet 74 is energized. The winding 76 of the electromagnet 74 is connected through the rectifier 78 and transformer 80 across load conductors 18 and 20.

In operation, assuming that the generator 10 and the exciter 22 are driven by a suitable machine, such as a motor (not shown) to deliver power to a load (not shown) the electromagnet 74 is energized in accordance with the voltage across conductors 18 and 20 to control the number of sections of the rheostat 52 that are connected in circuit with the field winding 26 of the exciter 22. At the same time, the transformer 42 supplies current to the rectifiers 28 and 56 so that a current flows through the field windings 12 and 26, respectively, that is proportional to the load current and that is additive to the normal flow of field current resulting from the normal manner of exciting the machines.

Thus, it is apparent that the energization of the exciter 22 and the generator 10 is dependent upon the cooperation of the field rheostat 52 and the flow of current resulting from connecting the rectifiers 56 and 28 in the field winding circuits of the respective machines. For a normal operation of the system to supply a given load, the circuits and apparatus are as shown, the electromagnet 74 of the switching mechanism 66 being so energized that a number of the leaf members 68 are actuated to a circuit closing position to shunt a number of the sections of the field rheostat 52 from circuit with the field winding 26.

If the load varies slightly from the normal load as, for example, if the load increases slightly but still within the rated value of the generator 10, the energization of the electromagnet 74 is decreased slightly in proportion to the voltage drop across conductors 18 and 20 and additional leaf members 68 are actuated to circuit closing positions to shunt additional sections of the field rheostat 52 from the field winding circuit for the exciter 22 thereby increasing the excitation of the machine. At the same time, the small increase in load current occasioned by the small increase in load effects a slight increase in the current supplied to the rectifiers 56 and 28 so that the resulting current flow through the field winding 26 when added to the current occasioned by the change in the field rheostat 52 effects an increase in the output of the exciter 22 to increase the flow of current through the field winding 12 of the generator 10. As the rectifier 28 is connected additively in the circuit for the field winding 12, the slight increase in current occasioned by connecting the rectifier 28 in the field winding circuit also effects a slight increase in the current flowing through the field winding 12 to increase the excitation of the generator 10 and raise the voltage output therefrom to the normal rated value.

However, if the load applied to the system is large with respect to the rated capacities of the generator 10, it is readily apparent that the voltage drop is quite large and that the load current is increased greatly. The change in the voltage across the load conductors 18 and 20 is so great that the electromagnet 74 is so deenergized that all of the sections of the field rheostat 52 are shunted from the field winding circuit for the exciter 22 to tend to increase the excitation of the exciter 22. However, this change in the excitation of the exciter 22 is delayed by the inductance of its field. There is also further delay in increasing the excitation of generator 10 due to the inductance of its field. By connecting the rectifier 56 in circuit with the field winding 26, it is seen that a substantially instantaneous increase in the current therefrom is caused to flow through the field winding 26 to effect a substantially instantaneous increase in the excitation of the exciter 22. This is because current is supplied to the rectifier 56 which is proportional to the magnitude of the load current flowing in conductor 18 to initiate a flow of current in the field winding 26 that is a direct measure of the load current and that is additive to the field current controlled directly by the field rheostat 52. This is instantaneous initiation of a flow of current through the field winding 26 so increases the excitation of the exciter 22 that the flow of current therefrom through the field winding 12 of the generator 10 is greatly increased.

At the same time that the flow of current through the field winding 12 is so increased, it is noted that the change in the load current is also applied directly to the rectifier 28 to effect a further instantaneous change in the current flowing through the field winding 12, such further change being additive to the flow of current resulting from the increase in the excitation of the exciter 22. The large change in the load current flowing in conductor 18 thus effects a change in the field current flowing in the field winding 12 to aid in sustaining or so increasing the field current as to return the voltage of the generator 10 to its rated value.

By directly introducing a flow of current in the field windings of the exciter and of the generator supplied by the exciter, which is a measure of the load current, it is apparent that an instantaneous increase in the excitation of the respective machines is obtained to sustain the excitation necessary for maintaining rated voltage of the generator or to so instantaneously effect an increase in the excitation thereof as to maintain rated voltage. At the same time, the presence of the switching mechanism controlled by the change in the voltage across the load conductors is effective for controlling the excitation of the generator under normal load conditions, the change in the load current under normal operating conditions having relatively little effect on the excitation of the exciter and the generator. By connecting the rectifiers in the circuits with the field windings of the exciter and the generator as described, the present invention automatically minimizes the magnitude and the duration of the voltage drop when the loads applied to the generator are large in comparison with the rated value of the generator.

Although this invention has been described with reference to a particular embodiment thereof, it is, of course, not to be limited thereto except insofar as is necessitated by the scope of the appended claims.

I claim as my invention:

1. In a regulating system, a generator having a field winding and an armature winding disposed to supply a load, an exciter having an armature winding connected to the field winding of the generator for normally governing the excitation thereof, a field winding for the exciter, a field rheostat disposed to be connected in circuit with the field winding of the exciter, means responsive to variations in the voltage of the generator for controlling the connecting of the field rheostat in the field winding circuit of the exciter for normally controlling the excitation thereof, and means for directly and simultaneously introducing in each of the field winding circuits a flow of current that is proportional to the magnitude of the load current whereby an immediate increase in the excitation of the exciter and the generator is simultaneously initiated when the load is suddenly increased.

2. In a regulating system, a generator having a field winding and an armature winding disposed to supply a load, an exciter having an armature winding connected to the field winding of the generator for normally governing the excitation thereof, a field winding for the exciter, a field rheostat disposed to be connected in circuit with the field winding of the exciter, means responsive to variations in the voltage of the generator for controlling the connecting of the field rheostat in the field winding circuit of the exciter for normally controlling the excitation thereof, a rectifier connected in the field winding circuit for the generator, another rectifier connected in the field winding circuit for the exciter, and means for supplying the rectifiers with current that is a measure of the load current to effect an immediate increase in the excitation of the exciter and the generator when the load is suddenly increased.

3. In a regulating system, a generator having a field winding and an armature winding disposed to supply a load, an exciter having an armature winding connected to the field winding of thet generator for normally governing the excitation thereof, a field winding for the exciter, a field rheostat disposed to be connected in circuit with the field winding of the exciter, means responsive to variations in the voltage of the generator for controlling the connecting of the field rheostat in the field winding circuit of the exciter for normally controlling the excitation thereof, a rectifier connected in the field winding circuit for the generator, another rectifier connected in the field winding circuit for the exciter, and means for supplying the rectifiers with current that is proportional to the magnitude of the load current, the rectifiers cooperating to effect a simultaneous increase in the excitation of the exciter and the generator when the load is suddenly increased.

4. In a regulating system, a generator having a field winding and an armature winding disposed to supply a load, an exciter having an armature winding connected to the field winding of the generator for normally governing the excitation thereof, a field winding for the exciter, a field rheostat disposed to be connected in circuit with the field winding of the exciter, means responsive to variations in the voltage of the generator for controlling the connecting of the field rheostat in the field winding circuit of the exciter for normally controlling the excitation thereof, a rectifier connected in the field winding circuit for the generator, another rectifier connected in the field winding circuit for the exciter, and a current transformer connected in the load circuit for supplying current to the rectifiers that is a measure of the load current, the rectifiers cooperating to effect a simultaneous increase in the excitation of the exciter and the generator when the load is suddenly increased.

CARROLL E. VALENTINE.

REFERENCES CITED

The following references are of record in the file of this patent:

UNITED STATES PATENTS

| Number | Name | Date |
|---|---|---|
| 2,137,068 | Valentine | Nov. 15, 1938 |